United States Patent

[11] 3,607,854

| [72] | Inventors | Helena Antropiusova<br>Prague;<br>Karel Mach, Roztoky u Prahy; Bohumir Matsyska, Horni Pocernice; Jaromif Trneny, Kralupy nad VL ta vou; Cestmir Vyroubal, Kralupy nad VL ta vou, all of Czechoslovakia |
|---|---|---|
| [21] | Appl. No. | 771,286 |
| [22] | Filed | Oct. 28, 1968 |
| [45] | Patented | Sept. 21, 1971 |
| [73] | Assignee | Ceskoslovenska akademie ved<br>Prague, Czechoslovakia |
| [32] | Priority | May 18, 1967 |
| [33] | | Czechoslovakia |
| [31] | | PV 3594-67 |
| | | Continuation-in-part of application Ser. No. 729,896, May 17, 1968, now abandoned. |

[54] METHOD OF PRODUCING CIS-1,4-POLYISOPRENE
10 Claims, No Drawings

| [52] | U.S. Cl. | 260/94.3 |
|---|---|---|
| [51] | Int. Cl. | C08d 3/12 |
| [50] | Field of Search | 260/94.3, 94.9 B |

[56] References Cited
UNITED STATES PATENTS

| 3,165,503 | 1/1965 | Kahn et al. | 260/94.3 |
|---|---|---|---|
| 3,065,220 | 5/1956 | McManimie et al. | 260/94.9 |
| 3,224,980 | 12/1965 | Swift | 252/429 |

*Primary Examiner*—Joseph L. Schofer
*Assistant Examiner*—Richard A. Gaither
*Attorney*—Richard Low ABSTRACT: Isoprene is readily polymerized to have over 90 percent repeating isoprene units in the 1,4-cis configuration if the polymerization catalyst employed is prepared by reaction of titanium tetrachloride with an excess of dialkylaluminum fluoride. The proportions of the reactants are not critical because the resulting reduction of $Ti^{IV}$ does not go beyond $Ti^{III}$. The alkyl bound to aluminum should have 1 to 5 carbon atoms. Ethers may be added to the catalyst reaction mixture.

3,607,854

METHOD OF PRODUCING CIS-1,4-POLYISOPRENE

REFERENCE TO RELATED APPLICATION

This application is a continuation-in-part of our copending application Ser. No. 729,896, filed, May 17, 1968, now abandoned.

BACKGROUND OF THE INVENTION

This invention relates to the polymerization of isoprene, and particularly to the production of a polymer whose repeating units derived from isoprene, hereinafter referred to as isoprene units, are predominantly in the 1,4-cis configuration characteristic of natural rubber.

Polyisoprene approaches the desirable mechanical properties of natural rubber as the percentage of 1,4-cis-isoprene units approaches 100 percent. Polyisoprene containing more than 90 percent 1,4-cisisoprene units has been prepared heretofore by the polymerization of isoprene in the presence of Ziegler-Natta catalysts based on reaction products of alkylaluminum compounds and titanium halides prepared with or without small amounts of ethers, amines, or aminoethers which tend to hasten the polymerization, to increase the molecular weight of the polymer, and to reduce its gel content (see British Patent Nos. 856,317; 870,010; and 877,661 and French Patent No. 1,334,097, for example).

The methods for preparing the known catalysts are relatively inconvenient. The starting materials employed are trialkylaluminum and titanium tetrachloride, and must be mixed in carefully controlled amounts if useful results are to be achieved during the polymerization of isoprene, and it is particularly important that deviations from a mole ratio of 1:1 be limited to ±20 percent with the generally preferred triisobutylaluminum. Diethylaluminum chloride has also been used as a catalyst ingredient, but must be combined with titanium trichloride prepared by a separate reduction of the tetrachloride. The bromides make very poor catalysts with titanium halides, and the dialkylaluminum iodides lack catalytic activity in combination with titanium halides.

SUMMARY OF THE INVENTION

It has now been found that dialkylaluminum fluorides whose alkyl groups have one to five carbon atoms combine with titanium tetrachloride to form catalysts which re stereospecific in the polymerization of isoprene to predominantly 1,4-cis-polyisoprene while being capable of being prepared and used in a simple manner. The dialkylaluminum fluorides are prepared in a known manner and may be combined with titanium tetrachloride over a wide range of ratios, from 2:1 to 50:1, by merely keeping a mixture of the ingredients in a common inert, organic solvent at room temperature or below, preferably between 5° and 25° C., temperatures as low as −10° and as high as 30° C. being effective.

The reaction product is largely insoluble in organic solvents, and the entire heterogeneous reaction mixture including excess reagents may be contacted with isoprene to polymerize the latter under the usual polymerization conditions and at temperatures in the same range as those used in the catalyst formation. It will be appreciated that water and oxygen are to be excluded throughout the steps described above, the concentration of water and oxygen in the several reaction systems being held at maxima of about 20 and 15 p.p.m. respectively, as is conventional.

Best results have been obtained with the use of diethylaluminum fluoride, and the polymerization rate and polymer yield decrease with increasing length of the alkyl chain in the dialkylaluminum fluoride. The reaction becomes too slow and the yield too low for practical use with dioctylaluminum fluoride, and only the dipentylaluminum and lower alkylaluminum fluorides produce results which are economically acceptable.

The polymerization of isoprene in the method of the invention is performed in a solvent for isoprene, and the initial concentration of isoprene monomer in the polymerization mixture consisting essentially of the catalyst described above, the isoprene, and the solvent should be between 3 percent and 30 percent by weight, if the reaction is performed in a batch process.

Small amounts of diaryl or alkylaryl ethers may be added to the dialkylaluminum fluoride prior to its reaction with the titanium tetrachloride in the preparation of the catalyst, the ethers referred to in the above mentioned patents being useful, and diphenyl ether and anisole being representative of the same. The mole ratio of the ether to the aluminum or the dialkylaluminum fluoride in the catalyst reaction mixture should be between 0.1:1 and 1.5:1.

The polymerization conditions are not in themselves affected by the use of the catalyst of the invention instead of the known Ziegler-Natta catalysts, and the ratio of reactants used in preparing the catalyst has little effect on the outcome of the polymerization step as long as the broad limits outlined above are maintained. The polymerization equipment may be of the usual type and should provide for a protective atmosphere, nitrogen, argon, helium, and hydrocarbon vapors being common in this art. Agitation, is desirable as in any heterogeneous reaction system.

The novel features of this invention thus reside primarily in the catalyst mixture and in its preparation. The catalyst reaction mixture is prepared from a solution of the dialkylaluminum fluoride in an inert, liquid, organic solvent and from titanium tetrachloride either in the pure form or in organic solvent solution, hydrocarbons being the preferred solvents.

The mixture so prepared is permitted to age at a temperature indicated above. A reaction occurs within a period of 10 minutes to 5 hours, and usually within 1 to 2 hours. The protective atmosphere used in the preparation of the catalyst may consist of or include gaseous isoprene, and catalyst formation is not impeded by the presence of isoprene. Other compounds capable of reacting with the catalyst must be excluded or practically excluded as is well understood by those familiar with Fischer-Natta catalysts, the known catalyst inhibitors including carbon monoxide, carbon dioxide, acetylene, cyclopentadiene, and the like. If the catalyst is prepared in the presence of 1 to 5 moles isoprene per mole of dialkylaluminum fluoride, the induction period in the subsequent polymerization of isoprene is shortened.

The isoprene polymerization by means of the stereospecific catalysts of the invention is conveniently performed in a continuous operation at approximately constant isoprene monomer concentration in the polymerization mixture because of the noncriticality of the Al:Ti ratio in the preparation of the catalyst over the entire range from 2:1 to 50:1, and the availability of the entire catalyst reaction mixture for use in the subsequent polymerization. When a catalyst prepared by the method of the invention is used in batch polymerization of isoprene at decreasing monomer concentration, the mole ratio of aluminum to titanium is preferably held between 3:1 and 15:1.

The solvent employed in the polymerization may be selected from a wide range of organic liquids inert to the reactants and the catalyst, including the commercially available liquid aliphatic, cycloaliphatic, and aromatic hydrocarbons and their industrial mixtures such as gasoline or diesel fuel, but also inert chlorinated hydrocarbons such as chlorobenezene.

The catalyst concentration in the polymerization mixture is not critical. It may vary, for example, between 0.5 and 20 millimoles titanium tetrachloride equivalent or titanium per liter of polymerization mixture. The pressure in the polymerization vessel is without significant influence on the result obtained, and may be higher or lower than atmospheric pressure to suit available equipment.

The isoprene monomer may be added to the polymerization mixture as a gas or as a liquid, either all at once or over the course of the polymerization reaction at a rate to keep its concentration constant. In the latter case, the monomer concentration in the polymerization is even less critical than in batch polymerization in which the initial isoprene concentration should be between 3 and 30 percent of the polymerization mixture by weight.

The polymerization is terminated in a known manner when the desired conversion rate is achieved, and the catalyst is then deactivated and separated from the polymer formed. Methanol acidified with hydrogen chloride pure another alcohol may be added for this purpose together with a stabilizer, such as phenyl-$\beta$-naphthylamine. The polymer obtained is washed free of residual catalyst and catalyst components by means of suitable solvents, such as alcohols and ultimately water, and dried. It may then be processed further by methods conventional in the handling of natural rubber because of its content of 1,4-cis-polyisoprene which exceeds 90 percent.

The polymerization rate is increased and the gel content of the polymer is decreased under otherwise identical conditions if a small amount of one of the aforementioned ethers is added to the dialkylaluminum fluoride during preparation of the catalyst and prior to combining the dialkylaluminum fluoride with the titanium tetrachloride. The amines and aminoethers employed heretofore in this art are similarly effective, but best results have been obtained with diphenyl ether and anisole.

The polyisoprene prepared by the method of the invention cannot be distinguished structurally from natural rubber by infrared analysis. Its molecular weight is high, and the intrinsic viscosity values obtained in toluene at 30° C. are between 3.5 and 7 deciliter per gram (dl/g).

The advantages of the dialkylaluminum fluorides in the preparation of catalysts in the method of the invention are believed to be due in part to the fact that titanium tetrachloride is reduced by the dialkylaluminum fluorides of the invention to titanium trichloride at a practical rate, but not further. While the nature of the catalyst has not been fully elucidated at this time, it appears to consist essentially of a complex compound including aluminum absorbed to the surface of the titanium trichloride.

Any excess of dialkylaluminium fluoride present after formation of the catalyst is without influence on the activity of the catalyst and on the amount and properties of the polyisoprene formed. The preparation of the catalyst and its use are thereby simplified in a manner not available heretofore.

DESCRIPTION OF PREFERRED EMBODIMENTS OF THE INVENTION

The following examples are further illustrative of the method of the invention, and it should be understood that the invention is not limited to the specific examples chosen for the purpose of the disclosure only.

Example 1

A glass pressure vessel equipped with a magnetic stirrer was evacuated to a pressure of $10^{14}$ mm. Hg, disconnected from the vacuum pump, and 30 ml. pure benzene were introduced into the evacuated vessel, followed by 0.25 millimole titanium tetrachloride, and 1.75 millimole diethylaluminum fluoride in 1 ml. n-heptane. The mixture obtained by continuously stirring the contents of the vessel was held at 20° C. for one hour to form a catalyst by a chemical reaction resulting in the formation of a precipitate.

Enough gaseous isoprene was then introduced into the vessel and dissolved in the liquid medium present to make the concentration of monomeric isoprene in the mixture 3 percent by weight. The isoprene consumed by polymerization was made up by introducing additional monomer into the vessel.

After three hours, the monomer still present was drawn off by evacuating the pressure vessel, whereby the polymerization was stopped. The catalyst was deactivated by adding 30 ml. methanol acidified with hydrogen chloride.

The polymer formed was recovered by filtration and washed on the filter first with methanol containing phenyl-$\beta$-naphtylamine as an antioxidant, and finally with water. When dried in a vacuum at 30° C., it weighed 1.4 g. Its content of 1,4-cis-isomer was 93 percent, and its intrinsic viscosity was 4.1 dl/g in benzene at 20° C.

Example 2

The vessel of Example 1 was evacuated and charged with 30 ml. benzene and 0.25 millimole titanium tetrachloride as in Example 1, and thereafter with 2 millimoles diisobutylaluminum fluoride dissolved in a small amount of benzene. The mixture obtained by continuous stirring was permitted to react for 2 hours at 20° C.

Isoprene was then introduced as in Example 1, and the polymerization procedure described above was followed. The polymer formed weighed 1.1 g., contained 95.2 percent cis-1,4 units, and had an intrinsic viscosity of 3.4 dl/g in toluene at 30° C. Example 3

A pressure vessel was carefully dried and purged by passing dry, oxygen-free nitrogen, and a protective nitrogen atmosphere was maintained in the vessel throughout the subsequent steps. The vessel was charged with 90 ml. of a molar solution of isoprene in n-hexane. A catalyst was pared in another vessel, similarly purged and filled with nitrogen, from 0.78 ml. of a solution consisting of 60.5 g. titanium tetrachloride per liter of n-hexane, and 8.8 ml. of a solution consisting of 22.17 g. diethylaluminum fluoride per liter of n-hexane. The $TiCl_4$ and $(C_2H_5)_2AlF$ were permitted to react for one hour, and the suspension thereafter obtained was transferred under a nitrogen blanket to the vessel containing the isoprene solution by means of a syringe.

The catalyzed polymerization mixture was stirred at 20° C. for 2-1/2 hours, whereupon the polymerization was stopped by injecting 5 ml. methanol containing phenyl-$\beta$-naphthylamine into the liquid polymerization medium. The polymerization vessel was then opened, the polymer was recovered, washed with methanol, and dried at 45° C.

The yield of polymer was 72.2 percent based on the isoprene originally present, it contained 95.9 percent 1,4-cis units, and had an intrinsic viscosity of 3.8 dl/g in toluene at 30° C.

The general procedure outlined above was also followed in the following series of polymerization runs 4 to 8 in which the amount of titanium tetrachloride used in preparing the catalyst and the amount of isoprene were kept constant. The mole ratio of aluminum to titanium and the polymerization time were varied as indicated in the following Table. Diphenyl ether was added to the diethylaluminum fluoride during preparation of the catalyst mixture in Runs Nos. 6 and 7 in the listed mole ratio to titanium. The catalyst components were permitted to react for one hour except in Run No. 5 in which the catalyst components were permitted to react for 3 hours in the presence of 2.8 moles isoprene per mole Ti.

The table also lists the intrinsic viscosity 3 and the solubility of the polymer in toluene at 20° C., its content of 1,4-cis units in percent, and the yield in percent of isoprene originally present.

TABLE

| Run No. | Mole ratio, cat'st Al/Ti | Ether/Ti | Polym'n time, hours | Dl./g. | Sol'y, g./dl. | 1,4-cis, percent | Yield, percent |
|---|---|---|---|---|---|---|---|
| 4 | 5 |  | 4 | 4.54 | 57 | 96.2 | 86.5 |
| 5 | 25 |  | 3 | 5.1 | 59 | 96.3 | 45 |
| 6 | 5 |  | 2 | 4.9 | 65 | 96.0 | 62.4 |
| 7 | 5 | 4.5 | 1 | 4.61 | 97 | 95.6 | 86.6 |
| 8 | 2.5 | 1.1 | 2.5 | 4.52 | 62 | 94.2 | 90.3 |

We claim:

1. A method of producing polyisoprene having contents of 1,4 cis addition at least as high as 90 percent, consisting essentially of the steps of:

a. holding a mixture of a dialkylaluminum fluoride and of titanium tetrachloride at a temperature between −10° and 30° C. until a portion of said titanium tetrachloride is reduced to titanium trichloride and a portion of the aluminum of said dialkylaluminum fluoride is absorbed on said titanium trichloride to form a catalyst therewith,
   1. the alkyl of said dialkylaluminum fluoride having not more than five carbon atoms.
b. holding isoprene under polymerization conditions in the presence of said catalyst in an inert solvent medium until converted to polyisoprene,
   1. the temperature of said medium being between −10° and 30° C.

2. A method as set forth in claim 1, wherein at least one of said temperatures is between 5 and 25° C.

3. A method as set forth in claim 1, wherein said temperatures are between 5 and 25° C.

4. A method as set forth in claim 1, wherein said mixture is held at said temperature in the presence of an aryl ether or an alkyl aryl ether, said ether being added to said dialkylaluminum fluoride in the preparation of said mixture prior to the mixing of the titanium tetrachloride with said dialkylaluminum fluoride, the mole ratio of said ether to said dialkylaluminum fluoride being between 0.1:1 and 1.5:1.

5. A method as set forth in claim 4, wherein said ether is diphenyl ether or anisole.

6. A method as set forth in claim 1, wherein said alkyl is ethyl.

7. A method as set forth in claim 1, wherein the initial amount of said isoprene held under polymeriztion conditions is between 3 and 30 percent of the combined weight of said catalyst, said solvent medium, and of said isoprene.

8. A method as set forth in claim 1, wherein said dialkylaluminum fluoride and said titanium tetrachloride are dissolved in a common, inert, liquid, organic solvent while said mixture thereof is held at said temperature.

9. A method as set forth in claim 8, wherein said solvent jointly with said catalyst and unreacted dialkylaluminum fluoride is contacted with said isoprene while holding said isoprene under said polymerization conditions.

10. A method as set forth in claim 8, wherein said organic solvent and said solvent medium are free from significant amounts of oxygen and moisture.